United States Patent Office 3,011,993
Patented Dec. 5, 1961

3,011,993
BLENDS OF ALDEHYDE-SUBSTITUTED AMIDE INTERPOLYMERS WITH POLYETHYLENE AND METHODS OF BLENDING THE SAME
Erwin J. Kapalko, Oakmont, and Harold G. Bittle, Gibsonia, Pa., assignors to Pittsburgh Plate Glass Company, Allegheny County, Pa., a corporation of Pennsylvania
No Drawing. Filed July 17, 1957, Ser. No. 672,358
13 Claims. (Cl. 260—33.6)

This invention relates to resinous compositions, and pertains more particularly to resinous coating compositions characterized by freedom from solvent popping and film sagging, and by possessing excellent mar resistance.

In now abandoned application, Serial No. 584,473, filed May 14, 1956, to Roger M. Christenson which is a continuation-in-part of another application, Serial No. 490,409, filed February 24, 1955, now abandoned, it is disclosed that excellent resinous materials can be prepared by interpolymerizing an unsaturated amide with at least one other monomer containing a single $CH_2=C<$ group, and then reacting the interpolymer with an aldehyde such as formaldehyde or by interpolymerizing an alkylol acrylamide with at least one other monomer containing a single $CH_2=C<$ group. As will be discussed in more detail hereinafter, these resinous materials possess in the interpolymer chain recurrent structural groups of the following type:

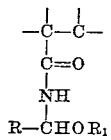

wherein R is a member of the class consisting of hydrogen, furyl, and lower alkyl, and $R_1$ is a member of the class consisting of hydrogen, lower alkyl, and butoxyethyl radicals.

It is also disclosed in the now abandoned application that the foregoing interpolymers can be advantageously combined with other resinous materials, including epoxide resins, fatty acid esters containing an epoxy group, vinyl resins, alkyd resins, amine resins, and the like, to give many outstanding properties, including excellent flexibility, excellent gloss, color retention, moisture resistance, stain resistance, grease resistance, heat resistance, detergent resistance, corrosion resistance, and many other useful properties. As such, they are particularly valuable in protective coating compositions, for example, as appliance finishes and in general as excellent coatings for metallic surfaces.

However, coating compositions prepared utilizing an interpolymer of a polymerizable amide as described in the foregoing paragraph, either as the sole resinous component, or in combination with other resinous materials, suffer from the disadvantage that they are subject to considerable solvent popping, and sagging or "curtaining," particularly when relatively thick films are deposited therefrom. Solvent popping manifests itself in the form of bubbles or pin holes in the cured film surface, and in general destroys the otherwise pleasing appearance of the film.

The exact cause of solvent popping is not known, but two theories have been advanced. The first is that the film sets up structurally, or actually begins to cross link before the last portion of the solvent, for example the last one-half per cent, is eliminated. This residual solvent cannot evaporate through the tough surface film, and collects in tiny bubbles, which may or may not rupture, depending upon the curing conditions. This is believed to be the more accurate theory of solvent popping.

The second theory is that as the resin cures, the water and/or alkanol given off during the cross-linking cure process is actually entrained under the film surface in the form of tiny bubbles in much the same way as a solvent would be.

Sagging or "curtaining" occurs when relatively thick films of the coating composition are applied to other than horizontal surfaces, and is due to gravitational flow of the films, and/or to film resoftening during the curing period.

It has now been discovered that both sagging and solvent popping can be eliminated by the very surprising method of incorporating in the composition a relatively small quantity of a polymer of ethylene. In addition to eliminating problems of solvent popping and sagging, the polyethylene tends to improve substantially the mar resistance of the film. Polyethylene has been utilized heretofore in coating compositions for this latter purpose, but never in coating compositions of the type described herein, and not for purposes of preventing solvent popping and/or sagging.

As indicated hereinabove, the coating compositions into which polyethylene is incorporated in accordance with this invention contain as a resinous component an interpolymer of an unsaturated amide with at least one other polymerizable monomer containing a single $CH_2=C<$ group. If the amide utilized is an alkylol amide, no further reaction of the interpolymer is necessary. However, if the amide does not contain an alkylol group, the interpolymer is reacted with an aldehyde to form the resinous component. The exact mechanism whereby the amide interpolymers are obtained is not definitely known, but is believed to begin by the formation initially of a relatively short chain soluble interpolymer having an approximate structure as follows, acrylamide being utilized for illustrative purposes:

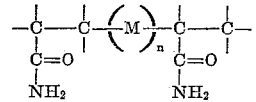

wherein M represents a unit of a monomer polymerizable with acrylamide, and $n$ represents a whole number greater than 1. For example, if styrene were utilized as the second monomer, M would represent the unit

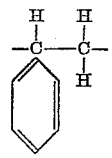

The short chain interpolymer then reacts with an aldehyde, as represented by formaldehyde, to give the structure:

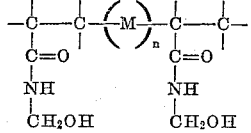

wherein M and $n$ have the significance set forth hereinabove.

It is well known that if the reaction between an amine radical and an aldehyde takes place in the presence of an alkanol such as butanol (Payne, Organic Coating Technology, Wiley & Sons, New York, 1954, volume I, pages 328–336), that at least some of the hydroxyl groups will be converted to ether groups.

The aldehyde-modified interpolymers are characterized by having amido hydrogen atoms replaced by the structure

wherein R is a member of the class consisting of hydrogen, furyl, and lower alkyl radicals and $R_1$ is a member of the class consisting of hydrogen, lower alkyl and butoxyethyl radicals. The preferred interpolymers, particularly from the standpoint of compatibility and curing properties are those in which a substantial proportion of the $R_1$ radicals represent alkyl, and particularly lower alkyl, groups.

Among the monomers which may be polymerized with acrylamide are included methyl acrylate, ethyl acrylate, butyl acrylate, isobutyl acrylate, hexyl acrylate, octyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, dimethybenzyl methacrylate, durenediol dimethacrylate, and the like. In general, it is preferred that the monomer utilized contain a single $CH_2\!\!=\!\!C\!<$ group in terminal position, and an especially preferred group of monomers includes ethyl acrylate, butyl acrylate, methyl acrylate, methyl methacrylate, monomethyl styrene, vinyl toluene, acrylic acid, and methacrylic acid.

It has been found that preferred amide interpolymers are obtained when at least two monomeric compounds are interpolymerized with the amide. In this manner it is possible to tailor the interpolymer to have any desired degree of hardness of flexibility. For example, one useful ternary interpolymer is prepared from acrylamide, ethyl acrylate and styrene. Also, a small amount of methyl methacrylate tends to improve the hardness of two component interpolymers where one of the monomers is of the type which forms soft homopolymers, and the presence of an acid monomer such as acrylic acid, methacrylic acid, crotonic acid, maleic acid, or fumaric acid in an amount of about .3 percent to 35 percent by weight has been found to be particularly useful as an internal catalyst in that it imparts to the coating composition desirable compatibility and fast curing properties.

Interpolymers of an unsaturated amide with one or more polymerizable monomers are most readily prepared by carrying out the polymerization in a solvent in which the amide and the other monomer(s) are soluble, and at reflux temperatures. Butanol has proven to be a satisfactory solvent in most cases. Isopropyl alcohol, butylene glycol monobutyl ether, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

In carrying out the polymerization reaction a peroxygen type catalyst is ordinarily utilized. Useful catalysts for this purpose include acetyl benzoyl peroxide, hydroxyheptyl peroxide, methylethyl ketone peroxide, cyclohexanone peroxide, cyclohexyl hydroperoxide, 2,4-dichlorobenzoyl peroxide, cumene hydroperoxide, t-butyl hydroperoxide, methylamyl ketone peroxide, acetyl peroxide, lauroyl peroxide, benzoyl peroxide, methylcyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of acrylamide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secured desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or accurate control of reflux conditions are important in carrying out the polymerization because of the very rapid reaction rate and because the reaction is highly exothermic. Some control of the heat of reaction is obtained by adding the acrylamide to the polymerization mixture incrementally. Good agitation is also desirable.

Another method for preparing amide interpolymers involves utilization of "block" and "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the amide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and in fact, almost any desired property can be "tailored" into the interpolymer.

It is preferred that the interpolymer contain from about 5 percent to about 50 percent by weight of the polymerizable unsaturated amide, the balance being the other ethylenically unsaturated monomer(s). It has been found that those interpolymers containing the higher levels of amide with those monomers which ordinarily form hard homopolymers, give hard and flexible films, whereas interpolymers containing lower levels of amide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymer. For example, in some ternary interpolymer systems it may be desirable to utilize about 20 percent by weight of acrylamide, and 40 percent of two additional monomers such as styrene and butadiene, or in some instances, such as when acrylic acid, methacrylic acid, or some other ethylenically unsaturated acid is utilized as an internal catalyst, it is desirable that the interpolymer contain about 20 percent acrylamide, a total of about 72 percent to 79 percent of two additional ethylenically unsaturated monomers and about 1.0 percent to about 8.0 percent of the unsaturated acid. The amount of the monomers necessary in any interpolymerization reaction can readily be determined by simple experiment.

Useful resinous materials are obtained by reacting the interpolymers prepared according to the method described above with an aldehyde. Formaldehyde, in solution in water (formalin) or in a lower alcohol such as butanol, or a formaldehyde yielding substance such as paraformaldehyde, trioxymethylene, or hexamethylenetetraamine, is greatly preferred. However, other aldehydes including acetaldehyde, butyraldehyde, furfural, and the like, preferably containing only atoms of carbon, hydrogen and oxygen, can be used. Aldehydes containing two or more aldehyde groups, such as glyoxal, should not be used inasmuch as they cause gel formation when reacted with amide interpolymers.

It is ordinarily preferred to utilize two equivalents of formaldehyde for each amide group present in the interpolymer, although this amount may be in considerable excess of the amount necessary to form methylol groups on the polymer chain. In fact, it is believed that only one equivalent of the aldehyde reacts with the interpolymer, with the other equivalent probably reacting with the alcohol solvent to form dialkyl formals, which are good high boiling oxygenated solvents. However, this preferred ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride. Other acid catalysts such as oxalic acid, hydrochloric acid, or sulfuric acid may also be utilized, although there is some possibility of gelation occurring if the catalyst is too strongly acidic. Alkaline catalysts such as sodium hydroxide, potassium hydroxide, hexamethylenetetraamine, and other basic amines may also be utilized, and, in fact, there is evidence to indicate that the use of the basic catalysts tends to give faster curing resin films.

If desired, the catalyst may be dispensed with entirely, although it may be difficult to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. In general, it is preferred to utilize from about 0.2 percent to 1.0 percent by weight of catalyst, based upon the weight of the amide interpolymer which is reacted with the aldehyde.

The reaction of the acrylamide interpolymer with the aldehyde can be carried out simply by adding the aldehyde and the catalyst (if one is utilized) to the polymerization mixture obtained by polymerizing acrylamide and one or more ethylenically unsaturated monomers and refluxing the resulting mixture for a period of from about 3 to 5 hours until a desired viscosity is obtained. The water of condensation can be removed by azeotropic distillation as may a portion of the solvent if desired. In fact, when the aldehyde is utilized in the form of a solution an an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials may also be obtained by first reacting the unsaturated amide with an aldehyde such as formaldehyde to obtain an alkylol amide, for example, methylol acrylamide, and then polymerizing the resulting material with one or more of the ethylenically unsaturated monomeric materials disclosed hereinabove. The polymerization utilizing the alkylol amides is carried out in substantially the same manner as when the unsaturated amide is interpolymerized with one or more ethylenically unsaturated monomers. Of course, subsequent reaction with an aldehyde is unnecessary.

In place of acrylamide, other polymerizable amide monomers such as methacrylamide, itaconic diamide, or maleuric acid and esters thereof, which possess the structure:

wherein R is an alkyl radical, and imide derivatives thereof, such as N-carbamyl maleimide, which possesses the structure:

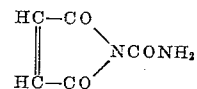

may be substituted, either partly or entirely for the acrylamide or alkylol acrylamide. By the term "polymerizable amide," as utilized herein, is meant a compound possessing at least one polymerizable double bond and at least one amide group capable of reaction with an aldehyde.

As disclosed hereinabove, the amide interpolymer resins can readily be combined with many other resinous materials to form useful compositions. In fact, one important advantage of the amide interpolymers prepared in the manner described hereinabove is the unusually good compatibility they exhibit with other resins. Such other resins include:

*Epoxide resins.*—These resins are polyglycidyl ethers of polyhydric compounds, and are preferably polyglycidyl ethers of dihydric phenols having as their sole functional groups epoxy and hydroxy groups. A representative epoxide resin structure may be illustrated as follows:

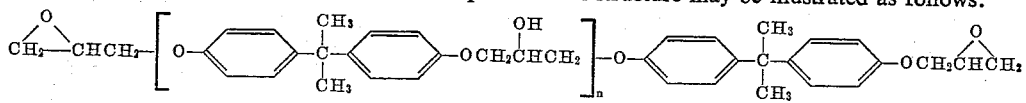

In the foregoing structure, $n$ is a number of a magnitude dependent upon the degree to which the etherification is carried. The epoxy resins are frequently characterized by molecular weight, and it has been found that those epoxy resins possessing the molecular weight above about 200 and preferably about 700 to 2000 are most suitable for combining with interpolymers of acrylamide. However, the epoxy resins having other molecular weights may also be utilized.

When an epoxy resin is blended with the amide interpolymers, amounts as low as about 5 percent by weight of the epoxy resin can be utilized as can amounts as high as 40 percent or more of the epoxy resin. Preferably, the epoxy resin is utilized in an amount of about 10 percent to about 20 percent.

*Vinyl resins.*—These resins are polymers of a vinyl halide, and include homopolymers such as polyvinyl chloride or polyvinyl bromide, as well as copolymers of a vinyl halide with a vinylidene compound, or a vinyl ester such as vinyl acetate, or the like. The preferred vinyl halide polymers are those which are polymers of vinyl chloride, vinyl acetate and a small portion of an unsaturated dicarboxylic acid such as maleic acid or fumaric acid. One particularly preferred resin contains approximately 86 percent vinyl chloride, approximately 12 percent of vinyl acetate, and approximately 1 percent of maleic acid. The vinyl resin can be blended with the amide interpolymer resin over extremely wide ranges. For example, either resin can be used in an amount of about 5 percent to 95 percent of the resin components, although preferably the vinyl resin is employed in an amount of about 5 percent to 75 percent by weight.

*Epoxidized oils.*—These materials may also be described as epoxy fatty acid esters in which the higher fatty acid group contains an epoxy group. They are ordinarily obtained by the reaction of peracetic acid with an ester of a higher faty acid, the fatty acid group containing about 8 to 22 carbon atoms. The quantity of fatty acid epoxide ester which is blended with the amide interpolymer may also be varied considerably. For example, amounts as low as about 5 percent by weight may be used as may amounts as high as about 50 percent or more by weight of the fatty acid epoxy ester.

*Alkyd resins.*—These resins are reaction products of dicarboxylic acids or anhydrides with polyols, and preferably the oil modified types, such as those derived from linseed oil, coconut oil, cottonseed oil, tall oil and castor oil. It has been found that those alkyd resins having a short oil length and a relatively high hydroxyl number or a high carboxyl number are more readily compatible with the acrylamide interpolymers than are alkyd resins having a low hydroxyl or low carboxyl value. The proportions in which the amide interpolymer and the alkyd resin are admixed are not critical; however, the most useful compositions are obtained when the components are blended in amounts such that there is present about 25 percent to 95 percent of the amide resin and about 5 percent to 75 percent of the alkyd resin.

In addition to the foregoing preferred modifying resins, the amide interpolymers may also be blended with other resinous materials including amine resins such as urea-formaldehyde resins, or melamine-aldehyde resins, silicone resins, polyvinylacetal resins, nitrocellulose, and the like.

Any of the many known polymers of ethylene may be added to the resinous compositions described hereinabove to eliminate solvent popping and sagging, and to increase the film mar resistance. Such polymers are ordinarily of the structure

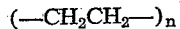

wherein *n* is a whole number greater than 1. These polymers are generally of a crystalline structure when subjected to X-ray analysis, but crystalline structure is not essential to the obtainment of the advantages possessed by the compositions of this invention. The preparation of polymers of ethylene is a well known process, and is described in many patents and text books, for example in Vinyl and Related Polymers (Schldknecht), chapter IX. In addition to homopolymers, copolymers of ethylene with other monomers containing a $CH_2=C<$ group may also be utilized to prevent solvent popping and/or sagging. In such copolymers the ethylene should be the predominant component. These copolymers are included within the expression "polymer of ethylene" as employed herein.

The ethylene polymer is incorporated into the resinous coating composition in one of two convenient ways. By one method, a hot solution of the ethylene polymer is prepared in a solvent such as xylene, and the resulting hot solution is added to the resinous coating composition with vigorous agitation in order to avoid crystallization and seed formation in the coating composition. A second method involves also forming a hot solution of the ethylene polymer in xylene or other solvent, and cooling the solution to form a gel. The resulting gel is then ground with the pigment into the coating composition. When the polymer of ethylene is dispersed in either of the above manners, no difficulty with polyethylene separation is encountered. Other methods of dispersing the ethylene polymers can also be employed.

The quantity of ethylene polymer which is employed to prevent solvent popping and sagging may be varied over a wide range. For example, it has been observed that amounts as low as about 0.10 percent have a substantial effect on minimizing solvent popping and sagging, and on the other hand, amounts as high as about 25 percent by weight of the resinous components can be employed. When the amount of the ethylene polymer is in excess of about 2.0 percent by weight, the gloss of the film tends to decrease. Of course, where high gloss is not an important or essential feature of the film, large amounts may be used to increase film mar resistance. For purposes of preventing solvent popping and sagging, it is preferred that the polyethylene be utilized in an amount of about 0.25 percent to 5.0 percent by weight of solid resinous components.

The following examples illustrate the preparation of amide interpolymers containing alkylol groups substituted for hydrogen atoms of the amido groups, as well as the preparation of blends of the amide interpolymers with polymers of ethylene, with or without the addition of other resinous materials. The examples are not intended to limit the invention, of course, for there are obviously many possible modifications and variations thereof.

EXAMPLE I

An interpolymer was prepared from a mixture of the following materials:

| | Parts by weight |
|---|---|
| Styrene | 40 |
| Ethyl acrylate | 45 |
| Acrylamide | 15 |
| Cumene hydroperoxide | 1 |
| Tertiary dodecyl mercaptan | 1 |

The above components were refluxed in butanol for about 6 hours. The resulting product was then admixed with 2 moles of formaldehyde in the form of a 40 percent solution in butanol and the mixture refluxed for an additional 3 hours. One half of the butanol was then removed by distillation and replaced by an equal volume of xylene. The resulting resinous product had the following properties:

| | |
|---|---|
| Solids (percent) | 48–52. |
| Weight per gallon | 8.0±0.1. |
| Viscosity (Gardner-Holdt) | U–W. |
| Color (Gardner 1933) | 5 (maximum). |
| Mineral spirits tolerance (cc. of naphtha per 100 grams resin) | 75 (minimum). |

EXAMPLE II

Eighty-five parts of vinyl toluene, 15 parts of acrylamide, 1 part of cumene hydroperoxide and 1 part of tertiary dodecyl mercaptan were refluxed for 2 hours and 0.5 parts of additional cumene hydroperoxide was added. Refluxing was continued for a further period of 2 hours. The product was then admixed with a solution comprising 2 moles of formaldehyde (40 percent solution in butanol), and ⅓ part of maleic anhydride was added. The resulting mixture was then refluxed for 3 hours after which the butyl alcohol was distilled to provide a product having the following properties:

Solids (percent) _____ 48–52.
Weight per gallon (pounds) _____ 7.9.
Viscosity (Gardner-Holdt) _____ X to Z.
Color _____ 8 (maximum).
Mineral spirits tolerance _____ 400 (minimum).

EXAMPLE III

This example illustrates the use of an unsaturated acid in the acrylamide interpolymerization to provide an internal catalyst which accelerates the cure of the coating composition. The interpolymer was prepared from the following components in the amounts set forth:

| | Parts by weight |
|---|---|
| Styrene | 39 |
| Ethyl acrylate | 44 |
| Acrylamide | 15 |
| Acrylic acid | 2 |
| Cumene hydroperoxide | 1 |
| Tertiary dodecyl mercaptan | 1 |

The above components were admixed and refluxed for 2 hours after which an additional 0.5 part of cumene hydroperoxide was added and reflux was continued for a further period of 2 hours. A solution comprising 2 moles of formaldehyde (40 percent concentration in butanol) was added together with about 0.33 part of maleic anhydride catalyst. The resulting mixture was refluxed for 3 hours, after which ½ of the butyl alcohol was removed by distillation and replaced by an equal amount of xylene.

EXAMPLE IV

The amide interpolymer of Example III was formulated into a white enamel by first adding a gel consisting of 97 pounds of a 15 percent solids solution of polyethylene (Semet-Solvay AC-629) to a mixture of 89 pounds of the resin of Example III and 262 pounds of titanium dioxide. The resulting mixture was then ground on a pebble mill for about 18 hours, after which 16 pounds of xylene were added and the milling continued for an additional ½ hour. The resulting paste weighed 492 pounds. To this paste was added a mixture of 48 pounds of a 60 percent solution of epoxy resin known as Epon 1001 in a mixture of 3 parts methyl isobutyl ketone and 1 part xylene, and an additional 425 pounds of the amide resin of Example III. Also added was 2.0 pounds of a 2 percent solution of ethylpolysiloxane in toluene and 10 pounds of pine oil.

This enamel was then adjusted to a viscosity of 45–70 seconds in a No. 4 Ford cup at 72° F. by the addition of further solvent, and then applied to metallic panels by hot spraying at a temperature of about 175° F. Films having a thickness of 4 mils or more could be applied without any tendency of the film to sag or solvent pop. Moreover, the film was extremely mar resistant and exhibited excellent color holding and chemical resistance.

EXAMPLE V

In order to demonstrate the advantages of incorporating polyethylene in amide interpolymer coating compositions the following enamel was prepared:

A mixture of 71 pounds of xylene, 220 pounds titanium dioxide and 75 pounds of the interpolymer of Example III was ground for 18 hours in a pebble mill, after which an additional 14 pounds of xylene was added and milling continued for 3 hours to give 470 pounds of paste. To the pigmented paste were added 358 additional pounds of the interpolymer of Example III and 40 pounds of a 60 percent solution of Epon 1001 and a mixture of 1 part xylene and 3 parts methyl isobutyl ketone, 1.6 pounds of ethyl polysiloxane resin as a 2 percent solution in xylene and 9 pounds of pine oil. This enamel was then hot sprayed onto metal panels to a thickness of 2 mils. Serious sagging or curtaining of the film occurred at this thickness. Severe solvent popping occurred at 1.5 mil thickness.

The foregoing composition was then modified by the addition of 122 pounds of a 10 percent solution of polyethylene (Semet-Solvay AC-629) in hot xylene. The polyethylene was added with vigorous agitation. The resulting composition when hot sprayed onto metallic panels could be applied to a thickness of 4 mils or more without a tendency to sag and without solvent popping.

EXAMPLE VI

An interpolymer was prepared from a mixture of the following materials:

| | Parts by weight |
|---|---|
| Styrene | 16 |
| Acrylamide | 3 |
| Acrylic acid | 1 |

The above polymerizable components were refluxed for about 6 hours in 20 parts by weight of butanol, in the presence of 1 part by weight of tertiary dodecyl mercaptan and 2 parts by weight of cumene hydroperoxide.

To this reaction mixture 6.34 parts by weight of a 40 percent solution of formaldehyde in butanol and 0.08 part by weight of maleic anhydride were added and the mixture refluxed for an additional 3 hours. Eleven parts of the butanol was then distilled off and a solution of 2.2 parts of an epoxy resin (Epon 1001) in 12.2 parts of toluene was added. The resulting composition had a 50 percent solids content, a Gardner-Holdt viscosity of U–X, a weight per gallon of 8.16 pounds and an acid value of 13.7.

The resin thus prepared was then utilized to demonstrate the two methods of incorporating the ethylene polymer therein.

*Method A*

One hundred nine parts of an ethylene polymer (Semet-Solvay AC-629) was placed in 616 parts of xylol and the mixture heated and stirred until clear. The mixture was then cooled slowly to form a gel in which extremely small particles of the polyethylene were present. Five parts by weight of this gel was then combined with 26 parts of the resin of this example, 53 parts of butanol and 267 parts of titanium dioxide, and the entire mixture ground on a pebble mill for 16 hours. An additional quantity of the acrylamide resin (71 parts) was then added to dilute the paste and the mixture ground for an additional 2 hours.

The paste thus prepared was then formulated into a coating composition by the addition of 486 parts of the acrylamide resin of this example, 42 parts of xylol and 47 parts of butyl carbitol. The coating composition weighed 9.6 pounds per gallon, and films thereof having a thickness of as much as 1.8 mils or more exhibited no solvent popping or sagging characteristics, whereas films of a thickness of about 1.5 mils exhibited substantial solvent popping and sagging when the ethylene polymer was not present in the composition.

*Method B*

A coating composition was prepared exactly as in Method A except that the polyethylene was not added during the preparation of the composition, but was incorporated later by adding 7 parts of a hot solution (140° F.) of polyethylene in xylol thereto. Films of this composition could also be sprayed at thicknesses of 1.8 mils or more without exhibiting solvent popping or sagging characteristics. If the polyethylene solution in either Method A or Method B is added cold or without sufficient agitation, the resulting coating composition will appear seedy and/or will have poor gloss. This method is particularly useful in that it provides a means of salvaging compositions which have a tendency to solvent pop or sag, and which otherwise could not be used.

In addition to the resins utilized in preparing the coating compositions of the specific examples, any other of the amide interpolymers disclosed hereinabove may likewise be utilized with excellent results either alone or in combination with resins compatible therewith. Similarly, any other polymer of ethylene may be employed with good results.

Although specific examples have been set forth hereinabove, it is not intended that the invention be limited solely thereto, for there are, of course, numerous possible variations and modifications which are included within the scope of the appended claims.

We claim:

1. A resinous composition which comprises an interpolymer of at least one amide selected from the class consisting of acrylamide, methacrylamide, itaconic diamide, maleuric acid, alkyl esters of maleuric acid, and N-carbamyl maleimide, and at least one other monomer containing a $CH_2=C<$ group, said interpolymer containing from about 5 percent to 50 percent by weight of said amide containing compounds in polymerized form based on the total weight of said interpolymer, and being characterized by having amido hydrogen atoms replaced by the structure

wherein R is a member of the class consisting of hydrogen, furyl, and lower alkyl, and $R_1$ is a member of the class consisting of hydrogen, lower alkyl, and butoxyethyl, and about 0.10 percent to 25 percent by weight of a polymer of ethylene, based on the weight of said amide interpolymer resin.

2. The resinous composition of claim 1 wherein the amide is acrylamide.

3. The resinous composition of claim 2 wherein the interpolymer is an interpolymer of styrene, ethyl acrylate and acrylamide.

4. The resinous composition of claim 2 wherein the interpolymer is an interpolymer of acrylamide and vinyl toluene.

5. The resinous composition of claim 2 wherein the interpolymer is an interpolymer of styrene, acrylic acid and acrylamide.

6. The resinous composition of claim 1 wherein there is also present a resin selected from the class consisting of a polyglycidyl ether of a polyhydric compound, an ester of an epoxy fatty acid containing at least 8 carbon atoms, an alkyd resin, a vinyl halide resin, a urea-formaldehyde resin, a melamine-aldehyde resin, and nitrocellulose.

7. The resinous composition of claim 6 wherein the resin selected from the class consisting of a polyglycidyl ether of a polyhydric compound, an ester of an epoxy fatty acid containing at least 8 carbon atoms, an alkyd resin, a vinyl halide resin, a urea-formaldehyde resin, a melamine-aldehyde resin, and nitrocellulose is a polyglycidyl ether of a polyhydric compound present in an amount of about 5 percent to 40 percent by weight of said amide interpolymer.

8. The resinous composition of claim 2 wherein the polymer of ethylene is a homopolymer of ethylene.

9. A method of incorporating a polymer of ethylene into a resinous composition comprising an interpolymer of an amide selected from the group consisting of acrylamide, methacrylamide, itaconic diamide, maleuric acid, alkyl esters of maleuric acid, and N-carbamyl maleimide, and at least one other monomer having a single $CH_2=C<$ group, said interpolymer containing from about 5 percent to 50 percent by weight of said amide in polymerized form based on the total weight of said interpolymer and being characterized by having amido hydrogen atoms replaced by the structure

wherein R is a member selected from the class consisting of hydrogen, furyl, and lower alkyl, and $R_1$ is a member of the class consisting of hydrogen, lower alkyl, and butoxyethyl, which comprises preparing a composition comprising a polymer of ethylene and an organic solvent and dispersing said composition in said interpolymer.

10. The method of incorporating a polymer of ethylene into a resinous composition comprising an interpolymer of an amide selected from the group consisting of acrylamide, methacrylamide, itaconic diamide, maleuric acid, alkyl esters of maleuric acid, and N-carbamyl maleimide, and at least one other monomer having a single $CH_2=C<$ group, said interpolymer containing from about 5 percent to 50 percent by weight of said amide in polymerized form based on the total weight of said interpolymer and being characterized by having amido hydrogen atoms replaced by the structure

wherein R is a member selected from the class consisting of hydrogen, furyl, and lower alkyl, and $R_1$ is a member of the class consisting of hydrogen, lower alkyl, and butoxyethyl, which comprises first forming a gel of said polymer of ethylene in a solvent therefor, and milling said gel with said amide interpolymer.

11. The method of claim 10 wherein the amide is acrylamide and said polymer of ethylene is a homopolymer, said homopolymer being utilized in an amount of about 0.5 percent to 5.0 percent by weight.

12. The method of incorporating a polymer of ethylene into a resinous composition comprising an interpolymer of an amide selected from the group consisting of acrylamide, methacrylamide, itaconic diamide, maleuric acid, alkyl esters of maleuric acid, and N-carbamyl maleimide, and at least one other monomer having a single $CH_2=C<$ group, said interpolymer containing from about 5 percent to 50 percent by weight of said amide in polymerized form based on the total weight of said interpolymer and being characterized by having amido hydrogen atoms replaced by the structure

wherein R is a member selected from the class consisting of hydrogen, furyl, and lower alkyl, and $R_1$ is a member of the class consisting of hydrogen, lower alkyl, and butoxyethyl, which comprises adding to said resinous composition a solution of a polymer of ethylene in an organic solvent, said solution being maintained at a temperature above the melting point of said polymer of ethylene.

13. The method of claim 12 wherein the amide is acrylamide and said polymer of ethylene is a homopolymer, said homopolymer being utilized in an amount of about 0.5 percent to 5.0 percent by weight.

References Cited in the file of this patent

UNITED STATES PATENTS

| | | |
|---|---|---|
| 1,933,052 | Fikentscher | Oct. 31, 1933 |
| 2,173,005 | Strain | Sept. 12, 1939 |
| 2,302,332 | Leekley | Nov. 17, 1942 |
| 2,386,674 | Flint | Oct. 9, 1945 |
| 2,718,515 | Thomas | Sept. 20, 1955 |
| 2,748,029 | Spear et al. | May 29, 1956 |
| 2,870,116 | Vogel et al. | Jan. 20, 1959 |